(12) United States Patent
Tanaka

(10) Patent No.: US 7,707,209 B2
(45) Date of Patent: Apr. 27, 2010

(54) RETRIEVAL METHOD FOR CONTENTS TO BE SELECTION CANDIDATES FOR USER

(75) Inventor: Tomohiko Tanaka, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 138 days.

(21) Appl. No.: 11/720,138

(22) PCT Filed: Nov. 25, 2005

(86) PCT No.: PCT/JP2005/021724

§ 371 (c)(1),
(2), (4) Date: Dec. 19, 2007

(87) PCT Pub. No.: WO2006/057356

PCT Pub. Date: Jun. 1, 2006

(65) Prior Publication Data

US 2008/0215522 A1    Sep. 4, 2008

(30) Foreign Application Priority Data

Nov. 25, 2004   (JP)   ............................. 2004-340319

(51) Int. Cl.
   *G06F 17/30*    (2006.01)
(52) U.S. Cl. ........................ 707/724; 715/738; 715/745; 715/853
(58) Field of Classification Search ........................ None
   See application file for complete search history.

(56) References Cited

U.S. PATENT DOCUMENTS 5,798,760 A * 8/1998 Vayda et al. ................. 715/834
5,812,134 A * 9/1998 Pooser et al. ............... 715/848

(Continued)

FOREIGN PATENT DOCUMENTS

JP       2001-265808       9/2001

(Continued)

OTHER PUBLICATIONS

English language partial translation of JP 2002-342360, Nov. 29, 2002.

(Continued)

*Primary Examiner*—Neveen Abel Jalil
*Assistant Examiner*—Jacques Veillard
(74) *Attorney, Agent, or Firm*—Greenblum & Bernstein, P.L.C.

(57) ABSTRACT

Each of information on user characteristic and information on game content characteristic is arranged as position information using two or more parameters on the same coordinate system. The contents are divided into a plurality of content groups. Upon reception of an information search request from a user, a distance between the position corresponding to the user characteristic and the position of the center of gravity of each content group is obtained unless the target content condition is decided. When the target content condition is decided, a distance between the segment connecting the user position with the content position selected as the target and the position of center of gravity of each content group is obtained. Not only the content contained in the group approximating the user characteristic or the target content but also the content contained in a comparatively approximating group is presented to the user as a selection candidate according to the obtained distance.

18 Claims, 10 Drawing Sheets

U.S. PATENT DOCUMENTS

| | | | | |
|---|---|---|---|---|
| 5,894,311 | A | * | 4/1999 | Jackson .................... 345/440 |
| 5,924,090 | A | * | 7/1999 | Krellenstein .................. 707/5 |
| 6,134,532 | A | | 10/2000 | Lazarus et al. |
| 6,460,036 | B1 | * | 10/2002 | Herz ........................... 707/10 |
| 7,054,870 | B2 | * | 5/2006 | Holbrook ..................... 707/10 |
| 7,437,358 | B2 | * | 10/2008 | Arrouye et al. ................ 707/4 |
| 2003/0037041 | A1 | | 2/2003 | Hertz |
| 2004/0030996 | A1 | | 2/2004 | Van Liempd et al. |
| 2005/0216434 | A1 | * | 9/2005 | Haveliwala et al. ............ 707/1 |
| 2006/0047678 | A1 | | 3/2006 | Saito et al. |
| 2007/0033169 | A1 | * | 2/2007 | Friedman ...................... 707/3 |

FOREIGN PATENT DOCUMENTS

| | | |
|---|---|---|
| JP | 2001-350793 | 12/2001 |
| JP | 2002-108924 | 4/2002 |
| JP | 2002-251401 | 9/2002 |
| JP | 2002-342360 | 11/2002 |
| JP | 2003-58571 | 2/2003 |
| JP | 2004-206679 | 7/2004 |
| WO | 00/08570 | 2/2000 |
| WO | 02/19158 | 3/2002 |

OTHER PUBLICATIONS

English language partial translation of JP 2001-350793, Dec. 21, 2001.
English language Abstract of JP 2004-206679.
English language Abstract of JP 2002-342360.
English language Abstract of JP 2001-350793.
English language Abstract of JP 2002-108924.
English language Abstract of JP 2002-251401.
English language Abstract of JP 2001-265808.
English language Abstract of JP 2003-58571.

* cited by examiner

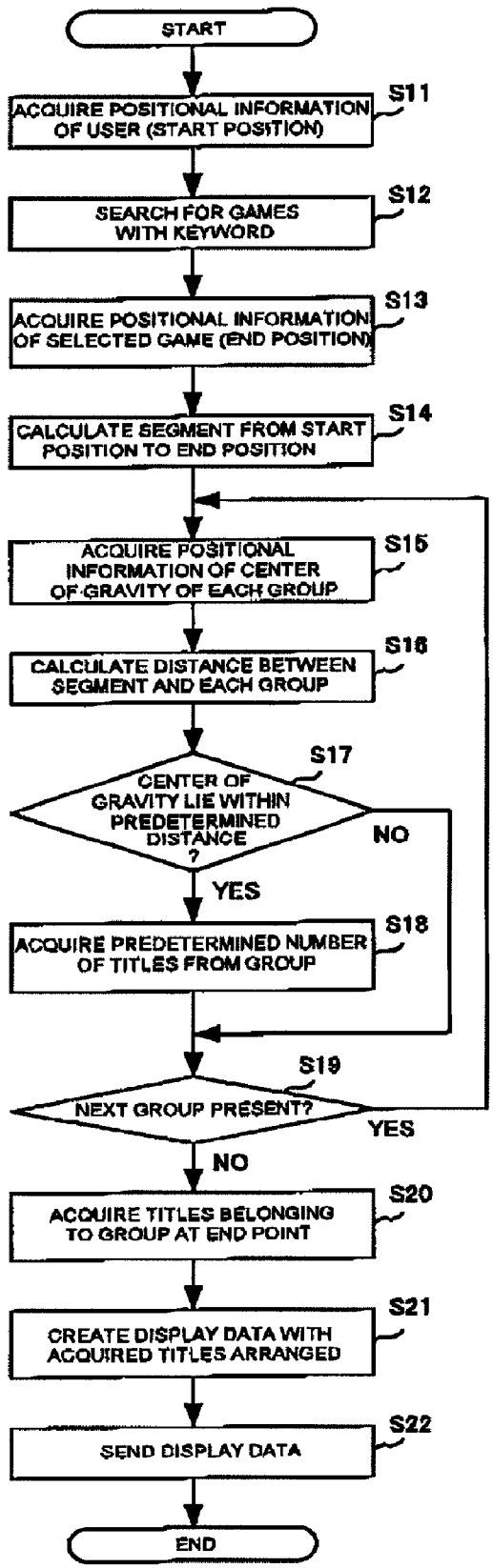

RETRIEVAL METHOD FOR CONTENTS TO BE SELECTION CANDIDATES FOR USER

TECHNICAL FIELD

The present invention relates to a technique of retrieving information relating to contents which are displayed on a selection screen of a terminal like a cellular phone and become selection candidates for a user, at the time of selecting a content, such as game software, with the terminal over a network.

BACKGROUND ART

In a case of specifying information which matches with a purpose from a vast amount of data present in a database, network or the like, a search engine to search for information by designating a keyword or the like is generally used. However, with simple designation of a keyword, there may be a huge amount of information hit, so that the search engine cannot narrow down information wanted by the user. As a more efficient method of narrowing down information, there has been proposed a retrieval method which uses the composition of a user who makes a search, such as the behavior history or interest.

Patent Document 1 discloses a technique capable of specifying information which reflects the behavior pattern or interest of a user by grasping the profile of the user and information to be searched as vectors having coordinate values and narrowing down information based on the similarity of vectors. With the use of Patent Document 1, when a user searches for books at a book sales site, for example, it is possible to present the user with information relating to recommendable books which reflect the purchase history of the user.

Patent Document 2 discloses a technique capable of selecting information close to the interest of a user by creating a database reflecting the interest of the user and reflecting information stored in the database on narrowing down information. With the use of Patent Document 2, even a beginner of information search or a user who does not have enough knowledge about information to be searched can easily obtain a search result close to what the user desires.

The retrieval methods that use the behavior history or interest of a user are effective for the user to quickly get information needed. In a case where the intention of a user is clear, such as a business purpose or a learning purpose, the use of those methods can allow information to be efficiently specified. When a user tries to search for contents for entertainment, such as game software, it is not always the case that the intention of the user is clear, so that the use of the aforementioned retrieval methods with priority given only to efficiency may lose the entertainment.

For example, there is a case where a user is not intended to play a particular game when he/she wants to enjoy a game in free time by connecting a cellular phone to a network. There is a case where a user wants recommendation of game software the user may prefer from game softwares downloadable from a server. In such a case, the server may mechanically match downloadable game softwares with data relating to the preference of the user and recommend game softwares with high matching in order. If the intention of the user is vague, however, recommendation of game softwares which do not match with the preference but may give appeal, rather than listing game softwares with similar inclination, increases the unexpectedness of recommended game softwares, resulting in higher entertainment.

In a case where a user searches for contents with a specific intention, the server likewise may rather recommend contents of a category which do not belong to a category closest to the user's intention but have some kind of relation with the user's preference, than recommend contents closer to the user's intention in order. In this case, the user can get to contents which the user has not noticed as his or her preference so far, and the unexpectedness of recommended game softwares increases, thus resulting in higher entertainment.

A user can retrieve unexpected and entertaining information as contents which do not match with the direct searching purpose or the preference of the user within a range relating to the user's preference are selected and recommended while basically narrowing down contents which would be recommended according to the user's searching intention or preference. The user can enjoy retrieving unexpected and entertaining information as if the user stopped by interesting shops on the way to the destination and enjoyed window shopping.

Patent Document 1: Japanese Patent Application Laid-Open No. 2001-265808

Patent Document 2: Japanese Patent Application Laid-Open No. 2003-58571

DISCLOSURE OF INVENTION

Problem to be Solved by the Invention

It is an object of the present invention to provide an information retrieval method or the like for retrieving information relating to contents which are displayed on the selection screen of a user terminal like a cellular phone and become selection candidates for a user in a case of recommending contents useful to the user.

It is an object of the invention to provide an information retrieval method or the like suitable for retrieving information relating to contents which become selection candidates for a user particularly in a case of accessing highly entertaining contents, such as game softwares, from a user terminal.

Means for Solving the Problem

An information retrieval method according to the first aspect of the invention is an information retrieval method for allowing a computer system that has received a request from a user terminal to retrieve information relating to contents to be displayed on the user terminal to be selection candidates for a user. The information retrieval method includes a stop in which the computer system acquires user positional information corresponding to user identification information received from the user terminal by referring to a user information storage section that stores information which can specify a composition of a user as positional information using two or more coordinate axes. The information retrieval method further includes a step in which the computer system acquires group positional information which is positional information of a representative position of each of two or more groups into which the contents are classified from a content positional information storage section that stores content classification information as positional information using the same two or more coordinate axes as those of the user positional information. The information retrieval method further includes a step in which the computer system executes an approximation calculation on the user positional information and the group positional information. The information retrieval method further includes a step in which the computer system specifies at least one content from each group which has been determined as having a higher order of approximation than a predetermined order of approximation in the approximation calculation or each of two or more groups included in groups whose orders of approximation lie within a predetermined rank. The information retrieval method further includes a step in which the computer system creates display data to be displayed as the selection candidates on the user terminal based on information including information relating to the content specified in the content specifying step. The information retrieval method further includes a step in which the computer system transmits the display data to the user terminal.

The information retrieval method according to the first aspect is applied to a case where a user passively searches for contents without specifying contents intended by the user. The information retrieval method according to the first aspect specifies not only contents belonging to a group most approximate to the composition of the user, such as preference, but also some contents from a relatively approximate group, and retrieves information relating to contents to be selection reports for the user. Contents whose relating information is presented as selection information are narrowed down by an approximation calculation on representative positions of individual groups into which contents to be searched are classified in advance and the position according to the composition of the user. Although execution of an approximation calculation on all contents would put an excessive load on the computer system, an approximation calculation for each content group reduces the load on the computer system.

An information retrieval method according to the second aspect of the invention is an information retrieval method for allowing a computer system that has received a request from a user terminal to retrieve information relating to contents to be displayed on the user terminal to be selection candidates for a user. The information retrieval method includes a step in which the computer system acquires user positional information corresponding to user identification information received from the user terminal by referring to a user information storage section that stores information which can specify a composition of a user as positional information using two or more coordinate axes. The information retrieval method further includes a step in which the computer system receives retrieval information input to the user terminal, and searches a content information storage section that stores information relating to contents to specify a content which matches with a retrieval condition as an index content using the retrieval information. The information retrieval method further includes a step in which the computer system acquires positional information of the index content from a content positional information storage section that stores content classification information as positional information using the same two or more coordinate axes as those of the user positional information. The information retrieval method further includes a step in which the computer system acquires group positional information which is positional information of a representative position of each of two or more groups into which the contents are classified from the content positional information storage section. The information retrieval method further includes a step in which the computer system executes an approximation calculation on positional information of a line segment connecting the user positional information to the positional information of the index content, and the group positional information. The information retrieval method further includes a step in which the computer system specifies at least one content included in either groups which are determined as having a higher order of approximation than a predetermined order of approximation in the approximation calculation or groups whose orders of approximation lie within a predetermined rank. The information retrieval method further includes a step in which the computer system creates display data to be displayed as the selection candidates on the user terminal based on information including information relating to the index content and information relating to the content specified in the content specifying step. The information retrieval method further includes a step in which the computer system transmits the display data to the user terminal.

The information retrieval method according to the second aspect is applied to a case where a user specifies contents intended by the user and actively searches for contents. The information retrieval method according to the second aspect specifies not only contents belonging to a group to which contents hit according to retrieval information input by the user are most approximate, but also some contents from a group approximate to a path having a position according to the composition of the user, such as preference, as a start point and a hit content as an end point, and retrieves information relating to contents to be selection reports for the user. Contents whose relating information is presented as selection information are narrowed down by an approximation calculation on representative positions of individual groups into which contents to be searched are classified in advance and the path. Although execution of an approximation calculation on all contents would put an excessive load on the computer system, an approximation calculation for each content group reduces the load on the computer system.

An information retrieval method according to the third aspect of the invention is an information retrieval method for allowing a computer system that has received a request from a user terminal to retrieve information relating to contents to be displayed on the user terminal to be selection candidates for a user. The information retrieval method includes a step in which the computer system acquires user positional information corresponding to user identification information received from the user terminal by referring to a user information storage section that stores information which can specify a composition of a user as positional information using two or more coordinate axes. The information retrieval method further includes a step in which the computer system receives retrieval information input to the user terminal, and searches a content information storage section that stores information relating to contents to specify a group which matches with a retrieval condition among two or more groups into which the contents are classified as an index group which matches with a retrieval condition. The information retrieval method further includes a step in which the computer system acquires positional information of the index group which is positional information of a representative position of the index group from a content positional information storage section that stores content classification information as positional information using the same two or more coordinate axes as those of the user positional information. The information retrieval method further includes a step in which the computer system acquires group positional information which is positional information of a representative position of each of the two or more groups into which the contents are classified from the content positional information storage section. The information retrieval method further includes a step in which the computer system executes an approximation calculation on positional information of a line connecting the user positional information to the positional information of the index group, and the group positional information. The information retrieval method further includes a step in which the computer system specifies at least one content included in either groups which have been determined as having a higher order of approximation than a predetermined order of approximation in the approximation calculation or groups whose orders of approximation lie within a predetermined rank. The information retrieval method further includes a step in which the computer system creates display data to be displayed as the selection candidates on the user terminal based on information including information relating to at least one content included in the index group and information relating to the content specified in the content specifying step. The information retrieval method further includes a step in which the computer system transmits the display data to the user terminal.

The information retrieval method according to the third aspect, like the information retrieval method according to the second aspect, is applied to a case where a user specifies contents intended by the user and actively searches for contents. The information retrieval method according to the third aspect specifies not only contents belonging to a group to which contents hit according to retrieval information input by the user are most approximate, but also some contents from a group approximate to the position of a path having a position according to the composition of the user, such as preference, as a start point and a bit group as an end point, and retrieves information relating to contents to be selection reports for the user. As in the information retrieval system of the second aspect, contents whose relating information is presented as selection information are narrowed down by an approximation calculation on representative positions of individual groups into which contents to be searched are classified in advance and the path. Although execution of an approximation calculation on all contents would put an excessive load on the computer system, an approximation calculation for each content group reduces the load on the computer system.

An information retrieval method according to the third aspect of the invention is an information retrieval method for allowing a computer system that has received a request from a user terminal to retrieve information relating to contents to be displayed on the user terminal to be selection candidates for a user. The information retrieval method includes a step in which the computer system acquires user positional information corresponding to user identification information received from the user terminal by referring to a user information storage section that stores information which can specify a composition of a user as positional information using two or more coordinate axes. The information retrieval method further includes a step in which the computer system receives retrieval information input to the user terminal, and searches a content information storage section that stores information relating to contents to specify a group which matches with a retrieval condition among two or more groups into which the contents are classified as an index group using the retrieval information. The information retrieval method further includes a step in which the computer system specifies one content in those contents which are included in the index group as an index content. The information retrieval method further includes a step in which the computer system acquires positional information of the index content from a content positional information storage section that stores content classification information as positional information using the same two or more coordinate axes as those of the user positional information. The information retrieval method further includes a step in which the computer system acquires group positional information which is positional information of a representative position of each of the two or more groups into which the contents are classified from the content positional information storage section. The information retrieval method further includes a stop in which the computer system executes an approximation calculation on positional information of a line segment connecting the user positional information to the positional information of the index content, and the group positional information. The information retrieval method further includes a step in which the computer system specifies at least one content included in either groups which have been determined as having a higher order of approximation than a predetermined order of approximation in the approximation calculation or groups whose orders of approximation lie within a predetermined rank. The information retrieval method further includes a step in which the computer system creates display data to be displayed as the selection candidates on the user terminal based on information relating to the index content and information relating to the content specified in the content specifying step. The information retrieval method further includes a step in which the computer system transmits the display data to the user terminal.

The information retrieval method according to the fourth aspect, like the information retrieval methods according to the second and third aspects, is applied to a case where a user specifies contents intended by the user and actively searches for contents. The information retrieval method according to the third aspect specifies not only contents belonging to a group to which contents hit according to retrieval information input by the user are most approximate, but also some contents from a group approximate to the position of a path having according to the composition of the user, such as preference, as a start point and a predetermined content belonging to a hit group as an end point, and retrieves information relating to contents to be selection reports for the user. As in the information retrieval system of the second aspect, contents whose relating information is presented as selection information are narrowed down by an approximation calculation on representative positions of individual groups into which contents to be searched are classified in advance and the path. Although execution of an approximation calculation on all contents would put an excessive load on the computer system, an approximation calculation for each content group reduces the load on the computer system.

An information retrieval program including the individual steps as segments in each of the information retrieval methods according to the first to fourth aspects can also be configured as falling in the scope of the invention. Computer readable recording media recording the information retrieval programs respectively corresponding to the information retrieval methods according to the first to fourth aspects can also be configured as falling in the scope of the invention.

Computer systems having program storage means which respectively stores the information retrieval programs respectively corresponding to the information retrieval methods according to the first to fourth aspects, and processing means stored in the program storage means can also be configured as falling in the scope of the invention. Data storage means of each of those computer systems includes at least the user information storage section and the content positional information storage section (and the content information storage section) which are used in the respective information retrieval method. Those computer systems have transmission means which transmits data including the display data to a user terminal according to the control of the processing means.

Computer systems having, as hardware, means which execute the individual steps in each of the information retrieval methods according to the first to fourth aspects can also be configured as falling in the scope of the invention. Those computer systems have the user information storage section and the content positional information storage section used in the respective information retrieval means as the user information storage moans and the content positional information storage means each of which is configured by hardware.

EFFECT OF THE INVENTION

The information retrieval method according to the first aspect of the invention can select contents even from a range different from a range relating to the composition of a user, while narrowing down the contents to be the selection candidates according to the composition of the user, such as preference thereof, and present information relating to contents which are displayed on the selection screen of a user terminal as selection candidates. The information retrieval method is applied as a particularly suitable one to a case where the user accesses highly entertaining contents, such as game software, over a network. A user who uses contents like game software can enjoy retrieving highly unexpected and entertaining information as if the user stopped by interesting shops on the way to the destination and enjoyed window shopping.

The information retrieval method according to the second to fourth aspects of the invention can select contents even from a range different from a range relating to the composition of a user, while narrowing down the contents to be the selection candidates according to the composition of the user, such as preference thereof, and contents corresponding to an intention input by the user, and present information relating to contents which are displayed on the selection screen of a user terminal as selection candidates. The information retrieval methods are applied as particularly suitable methods to a case where the user accesses highly entertaining contents, such as game software, over a network. A user who uses contents like game software can enjoy retrieving highly unexpected and entertaining information as if the user stopped by interesting shops on the way to the destination and enjoyed window shopping.

BRIEF DESCRIPTION OF DRAWINGS

FIG. 17 is a flowchart illustrating the flow of a second embodiment of an information retrieval method according to embodiments of the present invention.

BEST MODE FOR CARRYING OUT THE INVENTION

The best mode for carrying out the invention will be described in detail below with reference to the accompanying drawings. While the following description is given of an example where a cellular phone or a personal computer accesses a content server to retrieve game software, the embodiment is merely an example of the present invention and a terminal device and contents or the like used in the present invention are not limited to those of following embodiments.

Figure 1:
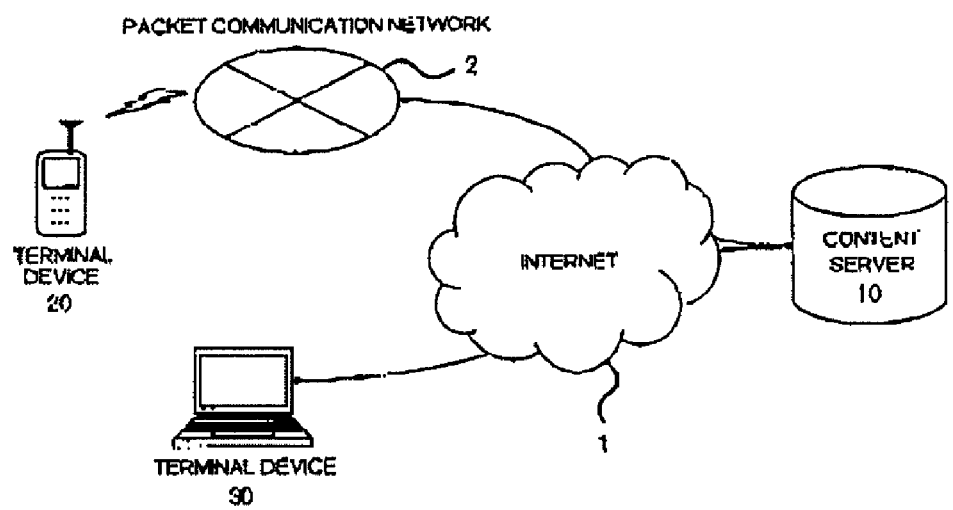
FIG. 1 is a diagram showing the mode of usage of an information retrieval system according to embodiments of the present invention.

FIG. 1 shows the mode of usage of an information retrieval system according to embodiments of the present invention.

The information retrieval system according to embodiments of the present invention is provided in a content server 10 which is operated by a provider of game software or the like. A user accesses the content server 10 over a packet communication network 2 and the Internet 1 from a portable terminal device 20 like a cellular phone, and acquires a list of selection candidates selected according to a predetermined condition from the content server 10. A user can access the content server 10 over the Internet 1 from a desk-top terminal device 30 like a personal computer, and acquire a list of selection candidates selected according to a predetermined condition from the content server 10. When the user selects a content from the list displayed by the terminal device 20 or the terminal device 30, corresponding game software is downloaded to the terminal device 20 or the terminal device 30 from the content server 10.

Figure 2:
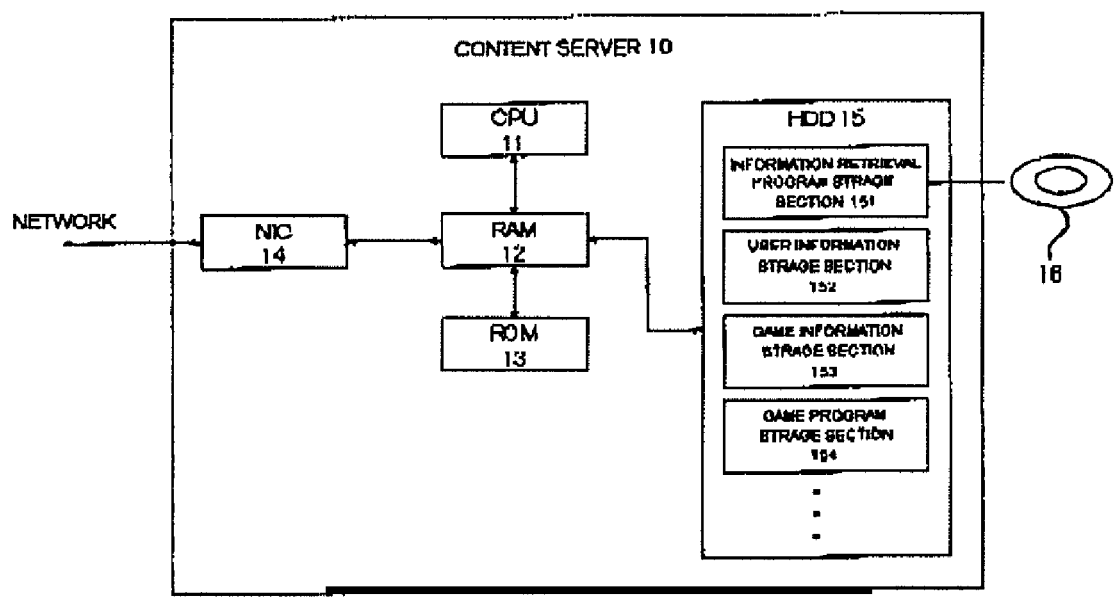
FIG. 2 is a block diagram showing the configuration of a content server having the information retrieval system according to embodiments of the present invention.

Referring to FIG. 2, the configuration and the operation of the content server 10 having the information retrieval system according to the embodiment of the invention will be described. The content server 10 has a CPU 11 which executes a program, a RAM 12 which is used as a working area at the time of executing the program, a ROM 13 which stores various basic programs for hardware controls, such as input control and output control, an NIC (Network Interface Card) which connects to the Internet 1 and transmits and receives information to and from the terminal device 20 or 30, and an HDD 15.

The HDD 15 has an information retrieval program storage section 151 which stores an information retrieval program according to embodiments of the present invention, a user information storage section 152 which stores user information to be described later, a game information storage section 153 which stores information relating to game software provided to the terminal device 20 or 20, and a game program storage section 154 which stores the program of game software itself. The content server 10 can read the information retrieval program recorded in recording medium 16 using an information reading device (not shown) and store the program in the information retrieval program storage section 151.

When the user transmits a display request for the selection screen for game software from the terminal device 20 or 30, the NIC 14 of the content server 10 accepts the display request received over a network such as the Internet 1. The display request for the selection screen includes information which enables unique identification of the user, such as a user ID. In the content server 10, the CPU 11 activates various programs stored in the ROM 13, and reads an information retrieval program from the information retrieval program storage section 151 into the RAM 12 in order to create a screen for selecting and displaying game software on the terminal device 20 or 30. The CPU 11 executes the information retrieval program read into the RAM 12 using the RAM 12 as a working area, and executes one of the following processes depending on the presence/absence of a user's designation of a condition.

When the user does not designate any condition for game software to be displayed, the CPU 11 searches the user information storage section 152 using the user ID included in the display request received from the terminal device 20 or 30 as a key to acquire positional information on coordinates to which the user's preference or the like is reflected. The user information storage section 152 stores user's positional information in which criteria, such as liking an easy game or liking a happy game, to which the preference of each user is reflected, are set as two or more coordinate axes. Such user's positional information can allow a profile for each user to be created from the contents of game software the user has accessed in the past and a value according to the tendency of the user's operation to be set.

Referring to the game information storage section 153, the CPU 11 searches for game softwares which match with the user's preference or the like and specifies a target to be displayed on the selection screen according to a predetermined condition. For game softwares stored in the game program storage section 154, positional information of each game software using the same coordinate axes of the user information is stored in the game information storage section 153. When the criterion of positional information of the user is whether to like an easy game or to like a happy game, for example, the criterion of the positional information of the game software is how easy the game is or how happy the game is. Those game softwares whose positions on the coordinates are close to one another are grouped, and information which can specify game software belonging to each group is stored in the game information storage section 153. The position of the center of gravity of the position of game software on the coordinates is acquired in advance for each group, and stored in the game information storage section 153.

At the time of selecting game software which matches with the user's preference or the like from the game information storage section 153, an approximation calculation on positional information of the user on the coordinates for which the display request has been sent, and positional information of each game software on the coordinates is executed. The approximation calculation can be carried out by calculating the distance between two coordinate positions, calculating an internal product of the individual coordinate positions with the origin of the coordinates taken as a criterion, or the like, but is not limited to those methods as long as the order of approximation can be calculated.

When the user designates some condition for game software to be displayed, the CPU 11 searches the user information storage section 152 using the user ID included in the display request received from the user terminal as a key to acquire positional information on coordinates to which the user's preference or the like is reflected. Referring to the game information storage section 153, the CPU 11 searches for game softwares which match with the retrieval condition designated by the user to specify a content to be an index, and acquires positional information of the content to be the index on the coordinates. The CPU 11 draws a segment connecting the coordinate position of the user to the coordinate position of the index content to specify the coordinate position of the segment.

Referring to the game information storage section 153, the CPU 11 specifies game software which seems to be relevant to the user's preference or a target object, in addition to game software which matches best with the retrieval condition designated by the user, such as the index content, as what is to be displayed on the selection screen by an approximation calculation on the position of the segment and the position of each content. The approximation calculation can be carried out by calculation of the distance between the coordinate position of the content and the coordinate position of the segment, calculation of an internal product of the coordinate position of the content and the coordinate position of the line with the origin of the coordinates taken as a criterion, but is not limited to those methods as long as the order of approximation can be calculated.

In any case, when some game softwares which match with the user's preference or the like are specified, the CPU 11 creates data for the selection screen showing the titles or the like of those game softwares, and sends it from the NIC 14 to the terminal device 20 or 30 that the user operates, over the Internet 1 or the like. The selection screen according to the sent data is displayed on the display device of the terminal device 20 or 30. When the user checks the selection screen on the terminal device 20 or 30 and selects one title therefrom, information relating to the title of the game software is sent to the content server 10. When receiving the information relating to the title sent from the terminal device 20 or 30, the CPU 11 of the content server 10 reads the associated game software from the game program storage section 154, and sends it from the NIC 14 to the terminal device 20 or 30 that the user operates, over the over the Internet 1 or the like.

Figure 3:
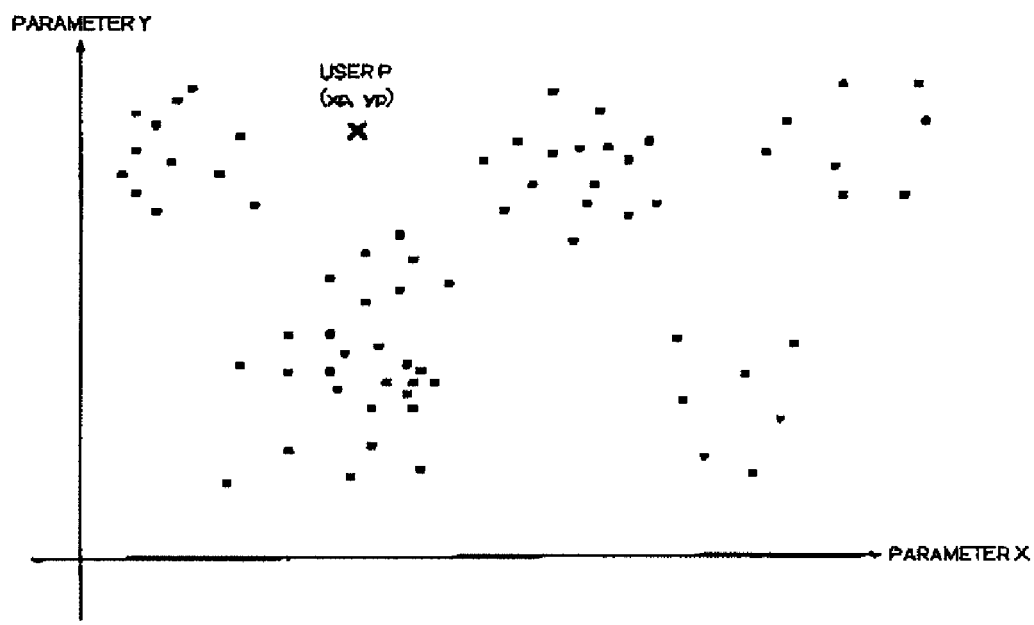
FIG. 3 is a diagram showing an example of the layout of a user and contents on coordinates in the information retrieval system according to embodiments of the present invention.
Figure 4:
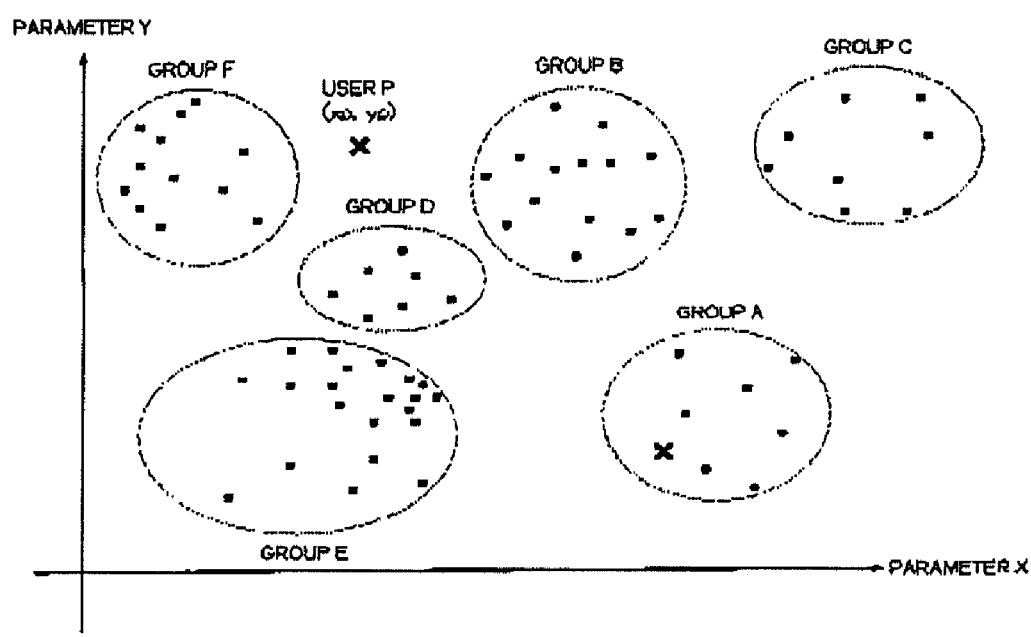
FIG. 4 is a diagram showing an example of grouping contents in the information retrieval system according to embodiments of the present invention.

Specific examples of an approximation calculation for selecting contents to be displayed in the information retrieval system according to embodiments of the present invention will be described referring to FIG. 3 to FIG. 15. It is assumed that the coordinate position of the user and the coordinate position of each content are determined, as shown in FIG. 3, and contents are group as shown in FIG. 4. FIGS. 5 to 8 show examples of an approximation calculation and specifying contents according to a first embodiment of passively searching contents without the user's specifying targets. FIGS. 9 to 15 show examples of an approximation calculation and specifying contents according to a second embodiment of actively searching contents while the user specifies targets.

FIG. 3 shows an example of the layout of positions to which the user's preference is reflected and classified positions of contents (game softwares in this example) on the same coordinates in the information retrieval system according to the embodiment of the invention. A mark x indicates the position of a user P, and other points indicate the positions of individual contents. Information relating to the coordinate position of the user P is stored in the user information storage section 152, while information relating to the position of each content is stored in the game information storage section 153.

As a parameter X and a parameter Y to be coordinate axes, for example, parameters indicating the composition of the content as the degree, such as the "easiness", the "degree of happiness" of each game software, are used. Although individual contents are arranged on the two-dimensional plane consisting of two parameters according to their characteristics in this example, the number of parameters is not limited to two and three or more parameters may be provided so that individual contents are arranged on space of two or greater dimensions.

For the user P, a coordinate position ((xp, yp) is determined as a position indicating the user's preference using the parameter X and parameter Y on the same coordinate axes. The user's preference may be created from registered information or the like of the user beforehand and set, or may be set by collecting profiles of contents selected by the user and analyzing the inclination of the contents selected by the user. The user information storage section 152 may not prestore the position indicating the user's preference. In this case, when receiving the transmission request for the selection screen, the CPU 11 has only to specify the coordinate position of the user based on the user's registered information and collected profiles corresponding to the request.

The parameters that are used as the coordinate axes for determining the position of the user and the position of the content may be set based on the user's preference and the characteristic of the content, or may be set based on the attributes of the user. In a case where the attributes, such as age and the frequency of usage, are used as parameters, for example, the position of each user is determined based on the age and the frequency of usage thereof, and the position of a content is determined based on an inclination value, such as the age at which each content is preferred, and the frequency of usage thereof.

Selection of a content which matches with the preference or the like of the user P is executed by an approximation calculation on the position of the user and the position of a content. In the approximation calculation, as shown in FIG. 4, the position of the center of gravity of each of groups into which contents located relatively close to one another are grouped is used as a representative value. This is because execution of the calculation of a content which matches with the preference or the like of the user P for all the contents would significantly increase the load of the operation process on the content server 10 as the number of contents increases. Execution of the approximation calculation using the position of the center of gravity of each of groups into which contents are grouped as a representative value can reduce the load on the content server 10.

With the position of the user P and the positions of contents shown in FIGS. 3 and 4 being premises, examples of an approximation calculation in a case of passively searching for contents without the user's designating a retrieval condition will be described as a first embodiment. When receiving the display request for the selection screen for contents whose retrieval condition has not been designated from the terminal device 20 or 30, the CPU 11 specifies the user who has made the display request as the user P with the user ID or the like as a key, and acquires positional information (xp, yp) of the user P from the user information storage section 152.

Figure 5:
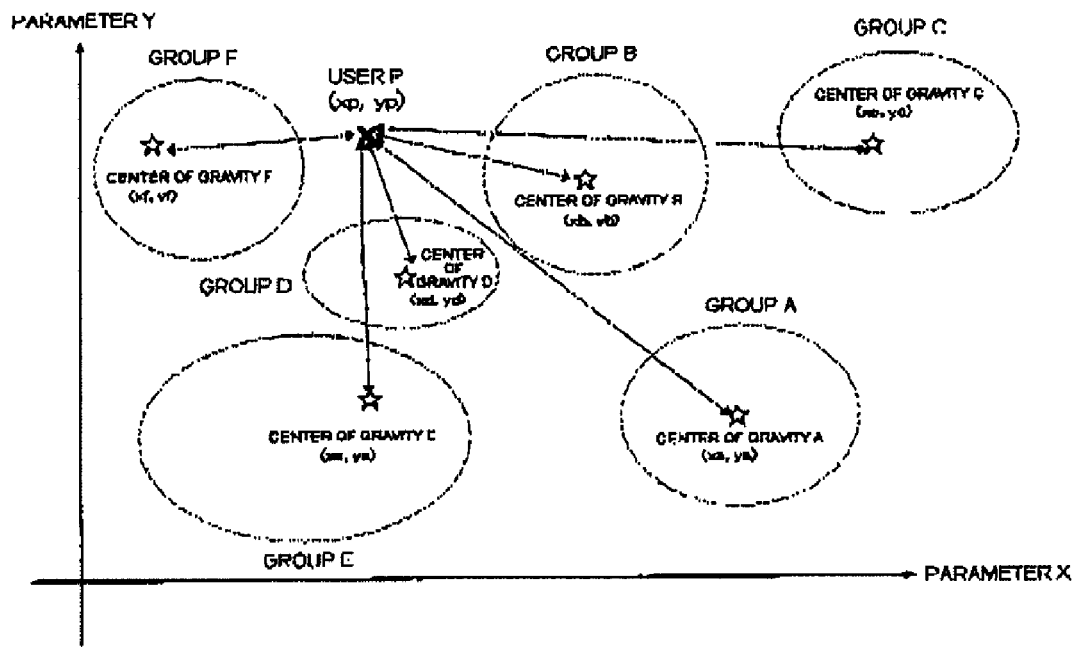
FIG. 5 is a diagram showing an example of execution of an approximation calculation on the position of a user and the center of gravity of the content group in a first embodiment in the information retrieval system according to embodiments of the present invention.

The CPU 11 acquires positional information of the center of gravity of each content group, e.g., positional information (xa, ya) of the center of gravity A for the group A, from the game information storage section 153. As shown in FIG. 5, when acquiring positional information of the centers of gravity A to F of the groups A to F, an approximation calculation on the position of the user P and each of the centers of gravity A to F is executed. The approximation calculation can be performed by calculating the distance between the position of the user P and each of the centers of gravity A to F based on the positional information of the user P and the positional information of each of the centers of gravity A to F.

It is preferable that a content close to the user's preference, i.e., a content close to the position of the user P be selected as a content to be displayed as a selection candidate. For this purpose, the CPU 11 selects the center of gravity D having the shortest distance to the position of the user P among the centers of gravity A to F, and specifies games D1 to D7 which are contents included in the group D as contents to be displayed as selection candidates. The CPU 11 may specify all the contents included in the group D as contents to be displayed as selection candidates. Because it is often the case where the number of contents which can be displayed on the screen of the terminal device 20 or 30 is limited, the CPU 11 may select some of contents included in the group D and specify them as contents to be displayed as selection candidates according to the order of approximation of the user's preference or according to the order of high general popularity.

To specify contents according to the user's preference in the order of approximation, it is necessary to calculate the distance between the position of each content and the position of the user P for all the contents included in the group D. To specify contents in the order of high popularity, for example, ranking based on the frequencies of access to individual contents counted should be stored in the game information storage section 153 and the CPU 11 should specify contents to be displayed as selection candidates by referring to the ranking.

Contents included in the group F and group B respectively corresponding to the center of gravity F which is at a relatively close from the position of the user P and the center of gravity B next to the center of gravity F, in addition to the center of gravity D, are added to the contents to be displayed as selection candidates. The contents belonging to those groups are not what match best with the user's preference in the calculation, but give the user unexpectedness and would possibly appeal to the user for they lie within a relatively close range.

As groups which are not closest to the user's preference but are determined as being relatively close to the user's preference, some number of groups determined based on the number of groups may be selected, all the groups whose centers of gravity are positioned shorter than a predetermined distances may be selected. With those conditions combined, a predetermined number of groups or less may be selected from those groups whose centers of gravity are positioned within a certain distance from the position of the user.

The CPU 11 should not necessarily specify all the contents included in each of the groups selected as being relatively close to the user's preference, as contents to be displayed as selection candidates. The CPU 11 may select some representative contents from the groups selected as being relatively close to the user's preference, and specify the contents as contents to be displayed as selection candidates.

Figure 6:
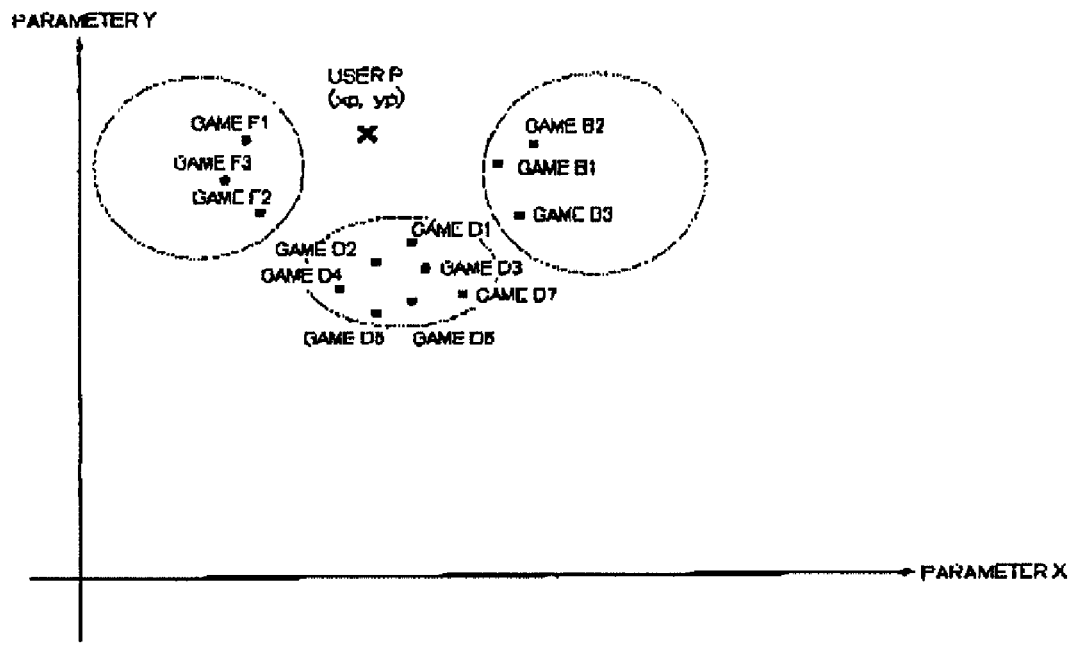
FIG. 6 is a diagram showing an example of selecting contents to be displayed on a selection screen from contents close to the user's preference from the results of an approximation calculation on the position of a user and the center of gravity of the content group in the first embodiment in the information retrieval system according to embodiments of the present invention.

In the example of FIG. 6, of the contents included in the group F and the group B, contents which are positioned close to the position of the user P are specified. That is, the CPU 11 calculates the distances between the position of the user P and the positions of each content included in the group F and the group B, and specifies a predetermined number of contents (which may be one) in order of the distance being short or contents whose distances from the position of the user P are shorter than a predetermined distance as contents to be displayed as selection candidates.

Figure 7:
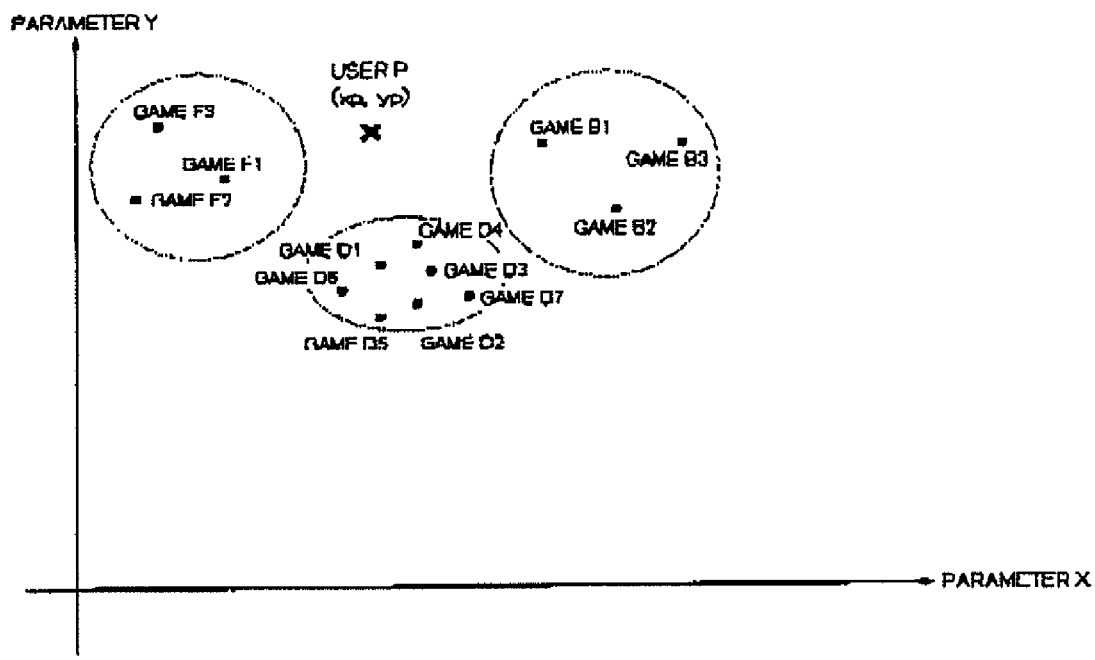
FIG. 7 is a diagram showing an example of selecting contents to be displayed on a selection screen from popular contents from the results of an approximation calculation on the position of a user and the center of gravity of the content group in the first embodiment in the information retrieval system according to embodiments of the present invention.

In the example of FIG. 7, of the contents included in the group F and the group B, contents which are popular are specified in order regardless of the distance to the position of the user P. In this example, ranking based on the frequencies of access to individual contents counted should be stored in the game information storage section 153 and the CPU 11 should specify contents to be displayed as selection candidates by referring to the ranking. The number of contents to be specified from each group may be one or multiple.

Figure 8:
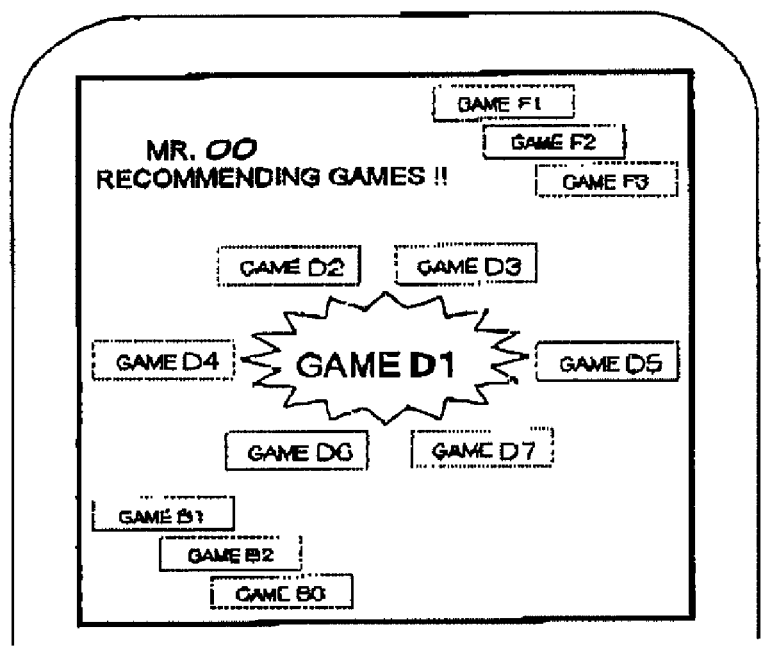
FIG. 8 is a diagram showing an example of a content selection screen to be displayed on a user terminal in the first embodiment in the information retrieval system according to embodiments of the present invention.

When contents to be displayed as selection candidates are specified, display data for displaying the selection candidates on the display device of the terminal device 20 or 30 is created as shown in FIG. 8. In the example of FIG. 8, the title of the game D1 which is closest to the is preference of the user P in the group D which is determined as being closest to the preference of the user P (or which is most popular in the group D) is displayed as a first candidate in the center of the display device which is most noticeable. The titles of the games D2 to D7 belonging to the same group D are displayed at a relatively center portion of the display device around the game D1, which is relatively noticeable.

In the example of FIG. 8, the titles of games F1 to F3 and games B1 to B3 which are selected from the group F and the group B which are determined as being relatively close are displayed at the upper right portion and the lower left portion of the display device which are less noticeable than the titles of the games selected from the closet group D. Those games are not what the user wants most, but may appeal to the user as unexpected games. Such unexpectedness seems to stimulate the playfulness of the user who has conducted a search without a particular intention and increase the entertainment.

On the display screen in FIG. 8, the title portions of individual selection candidates may have link information embedded to invoke the game softwares. When the user selects a title portion on the terminal device 20 or 30, a download request for the game corresponding to the selected title is sent to the content server 10 over the Internet 1 or the like. The terminal device 20 or 30 may activate the game software downloaded from the content server 10 over the over the Internet 1 or the like, so that the user can directly start an operation for the game.

With the layout examples of the user P and contents as shown in FIGS. 3 and 4 being premises, examples of an approximation calculation in a case of actively searching for contents with a retrieval condition designated by a user will be described as a second embodiment. The retrieval condition for contents can be designated by an arbitrary method, such as a keyword, a retrieval language, or a natural language. The description will be centered on a case where a user designates a retrieval condition for contents with a keyword. The display request for the selection screen for contents is sent to the content server 10 together with the retrieval condition designated by the user.

When receiving the display request for the selection screen for contents with the designated retrieval condition from the terminal device 20 or 30, the CPU 11 specifies the user who has made the request using the user ID or the like as a key, as the user P, and acquires positional information (xp, yp) of the user P from the user information storage section 152. The CPU 11 specifies a game A1 as a contents closest to the retrieval condition to specify a target designated by the user, and acquires positional information (xa1, ya1) from the game information storage section 153.

Figure 9:
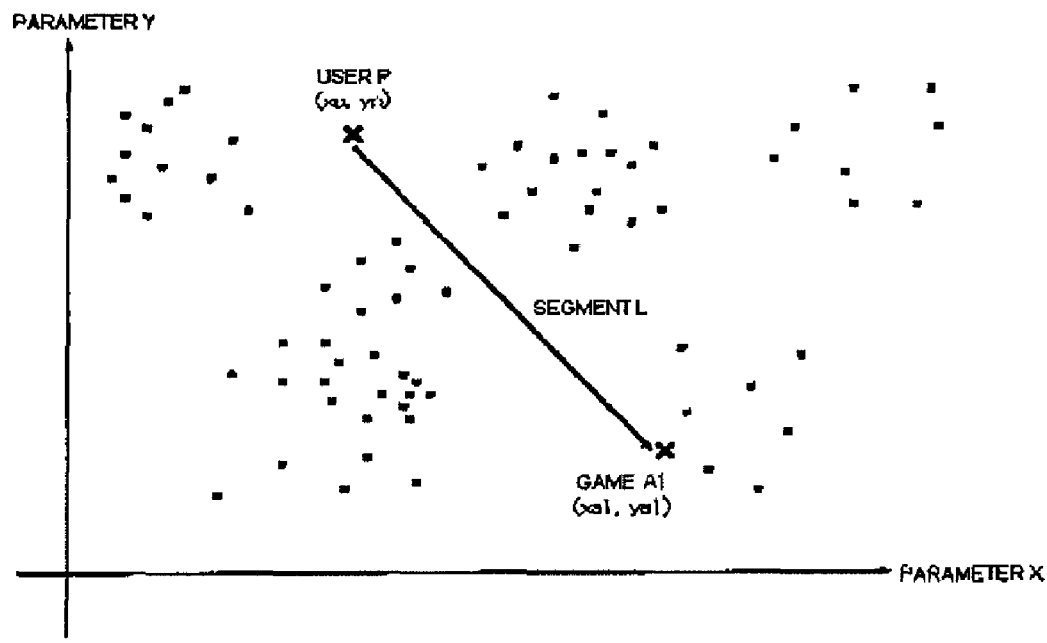
FIG. 9 is a diagram showing an example of connecting the position of a user to the position of a target object by a segment in a second embodiment in the information retrieval system according to embodiments of the present invention.
Figure 10:
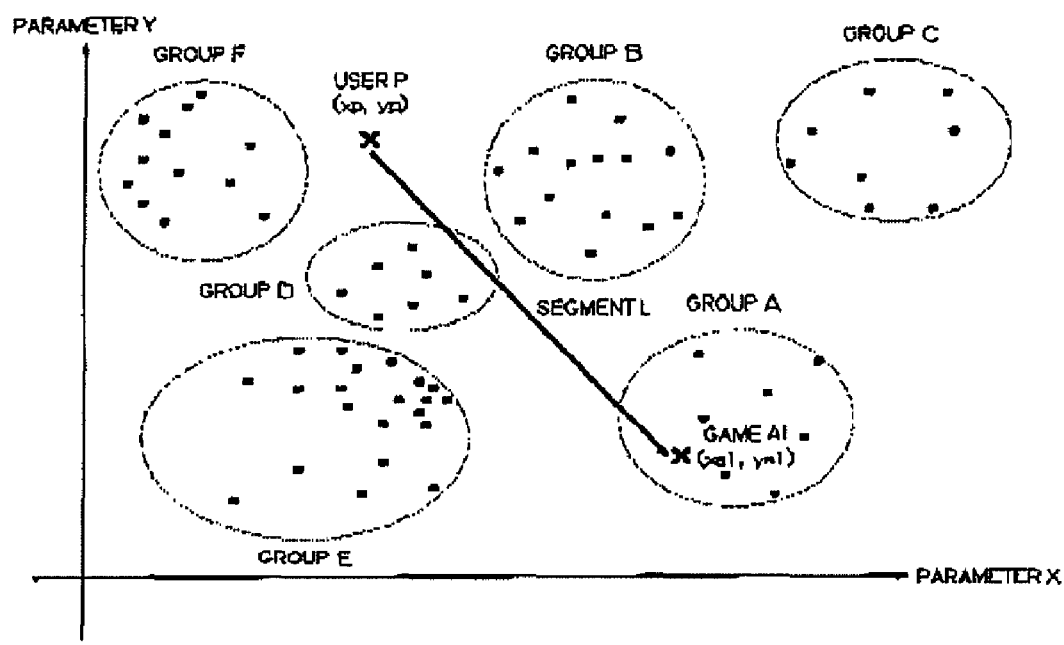
FIG. 10 is a diagram showing an example of the positional relationship between a segment connecting a user to a target object and a content group in the second embodiment in the information retrieval system according to embodiments of the present invention.

As shown in FIG. 9, the CPU 11 sets a segment L having the coordinate position (xp, yp) of the user P as a start point and the coordinate position (xa1, ya1) of the game A1 as an end point on the coordinates. As shown in FIG. 10, the CPU 11 executes an approximation calculation on the position of the segment L and the positions of the centers of gravity of the groups A to F, and specifies a group which may appeal to the user.

Figure 11:
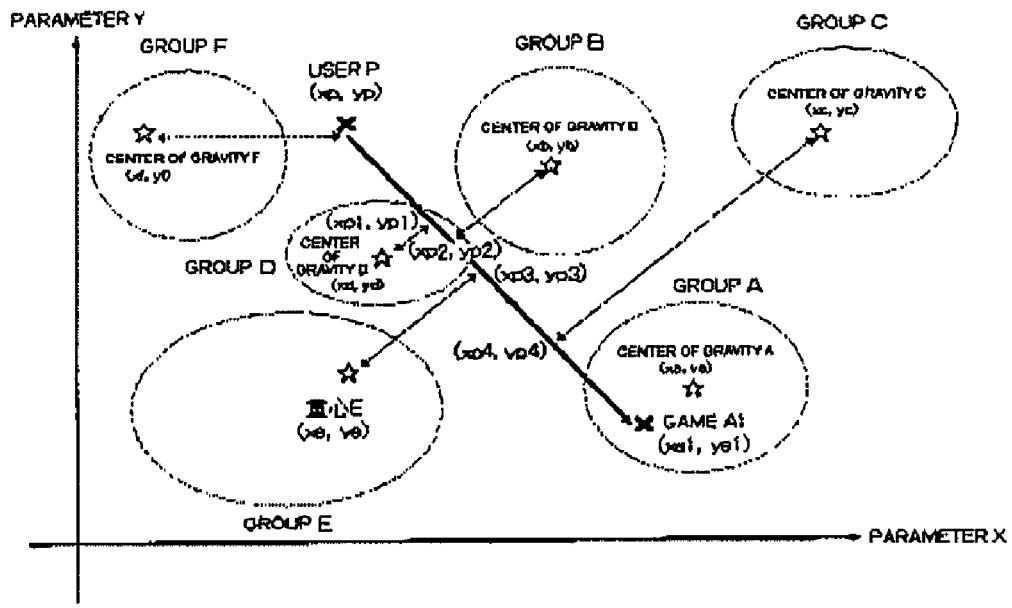
FIG. 11 is a diagram showing an example of execution of an approximation calculation on the position of a segment connecting a user to a target object, and the center of gravity of the content group in the second embodiment in the information retrieval system according to embodiments of the is present invention.

Specifically, as shown in FIG. 11, positional information of the centers of gravity A to F of the groups A to F is acquired, and an approximation calculation is executed for the segment and each of the centers of gravity A to F. The approximation calculation can be carried out by calculating the distance between the segment L and the position of each of the centers of gravity A to F based on the positional information of the segment L and the positional information of each of the centers of gravity A to F. The approximation calculation may be carried out by calculating the distance between the position of the user P and the position of each of the centers of gravity A to F based on the positional information of the user P and the positional information of each of the centers of gravity A to F.

With regard to the game A1 which is the end point of the segment L, when the retrieval condition which is designated by the user is a keyword describing the title of the game or classification, for example, one content may directly be specified by matching of game software whose information is stored in the game information storage section 153 with the keyword or the like is performed using an ordinary search engine. When the retrieval condition designated by the user is a retrieval language, one content is specified by retrieval using the retrieval language. When the retrieval condition designated by the user is a natural language, one content is specified by retrieval using the natural language.

The CPU 11 may specify a group which matches the retrieval condition designated by the user from content groups, and set the center of gravity A of the group A as the end point of the segment L. The group which matches with the retrieval condition can be specified by searching the groups according to the retrieval condition designated by the user if information on the characteristics or the like of contents of each group is stored in the game information storage section 153. If information on the characteristics or the like of contents of each group is not stored, it is possible to search information on game softwares stored in the game information storage section 153 according to the retrieval condition designated by the user, and specify a group to which hit contents belong, as such a group. The CPU 11 may set the position of that content in the contents included in the specified group which is closest to the position of the user or the position of the most popular content in the group A, as the end point of the segment L.

Suppose that with such an approximation calculation, the group D, the group B and the group E have been specified as groups which may appeal to the user. The number of groups to be specified and the method of specifying groups are not particularly limited, and may be determined under the conditions of within a predetermined number, within a predetermined distance or the like. The game A1 close to the condition designated by the user, first of all, and contents included in that group correspond to the contents to be displayed as selection candidates. The contents included in the group D, the group B and the group E specified by the approximation calculation are also to be displayed as selection candidates. All the contents included in those groups should not necessarily be displayed, but some representative contents should be selected and added to display targets.

Figure 12:
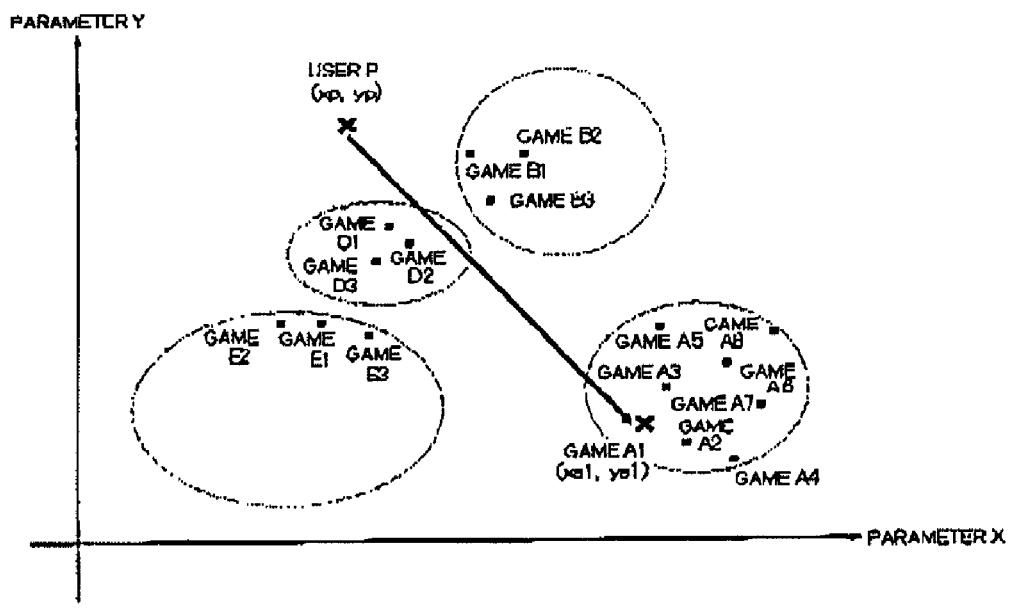
FIG. 12 is a diagram showing an example of selecting contents to be displayed on a selection screen from contents close to the user's preference from the results of an approximation calculation on the position of a user and the center of gravity of the content group in the second embodiment in the information retrieval system according to embodiments of the present invention.

In the example of FIG. 12, of the group D, the group B and the group E, contents which are positioned close to the position of the user P are specified. That is, the CPU 11 calculates the distance between the position of the user P and the positions of each content included in the group D, the group B and the group E, and specifies a predetermined number of contents (which may be one) in order of the distance being short or contents whose distances from the position of the user P are shorter than a predetermined distance, as contents to be displayed as selection candidates.

Figure 13:
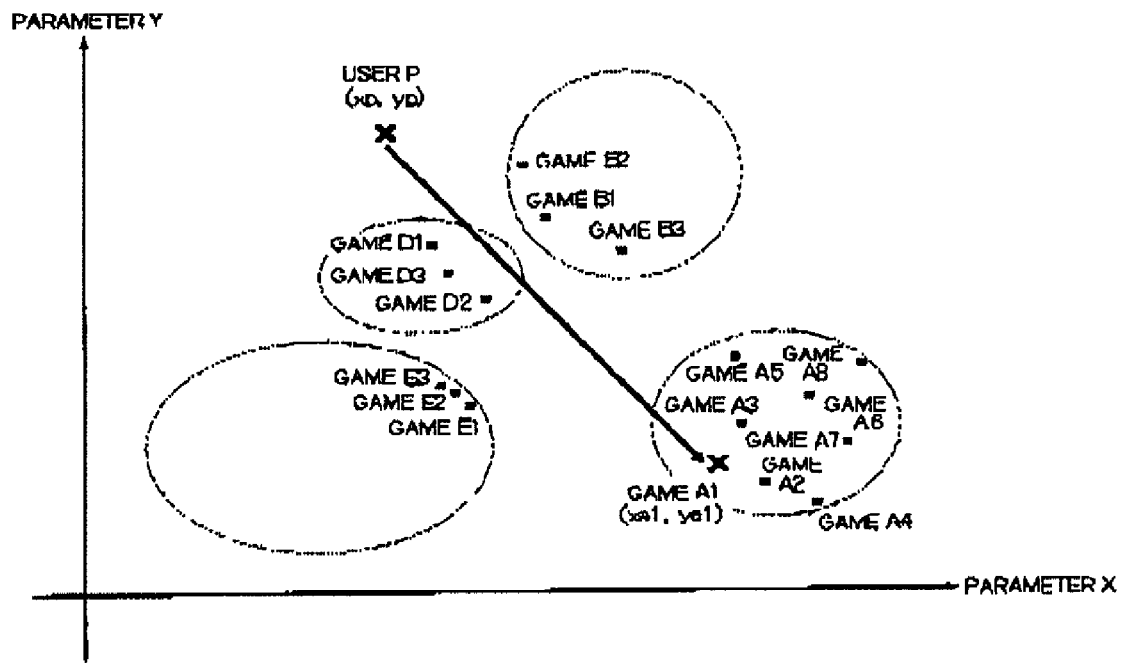
FIG. 13 is a diagram showing an example of selecting contents to be displayed on a selection screen from contents close to a path from a user to a target object from the results of an approximation calculation on the position of a user and the center of gravity of the content group in the second embodiment in the information retrieval system according to embodiments of the present invention.

In the example of FIG. 13, of the group D, the group B and the group E, contents which are positioned close to the segment L are specified. That is, as shown in FIG. 11, the CPU 11 calculates the distances between the position of the segment L any the positions of each content included in the group D, the group B and the group E, and specifies a predetermined number of contents (which may be one) in order of the distance from the segment L being short or contents whose distances from the position of the line L are shorter than a predetermined distance, as contents to be displayed as selection candidates.

Figure 14:
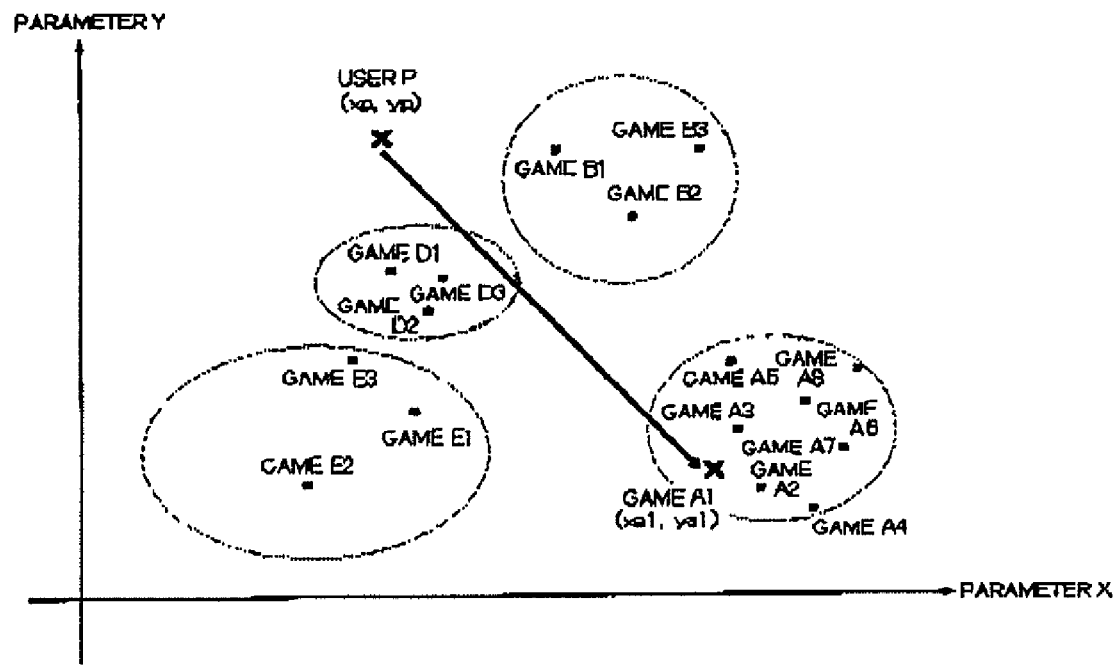
FIG. 14 is a diagram showing an example of selecting contents to be displayed on a selection screen from popular contents from the results of an approximation calculation on the position of a user and the center of gravity of the content group in the second embodiment in the information retrieval system according to embodiments of the present invention.

In the example of FIG. 14, of the group D, the group B and the group E, contents which are popular are specified in order regardless of the distance to the position of the user P or to the segment L. In this example, ranking based on the frequencies of access to individual contents counted should be stored in the game information storage section 153 and the CPU 11 should specify contents to be displayed as selection candidates by referring to the ranking. The number of contents to be specified from each group may be one or multiple.

Figure 15:
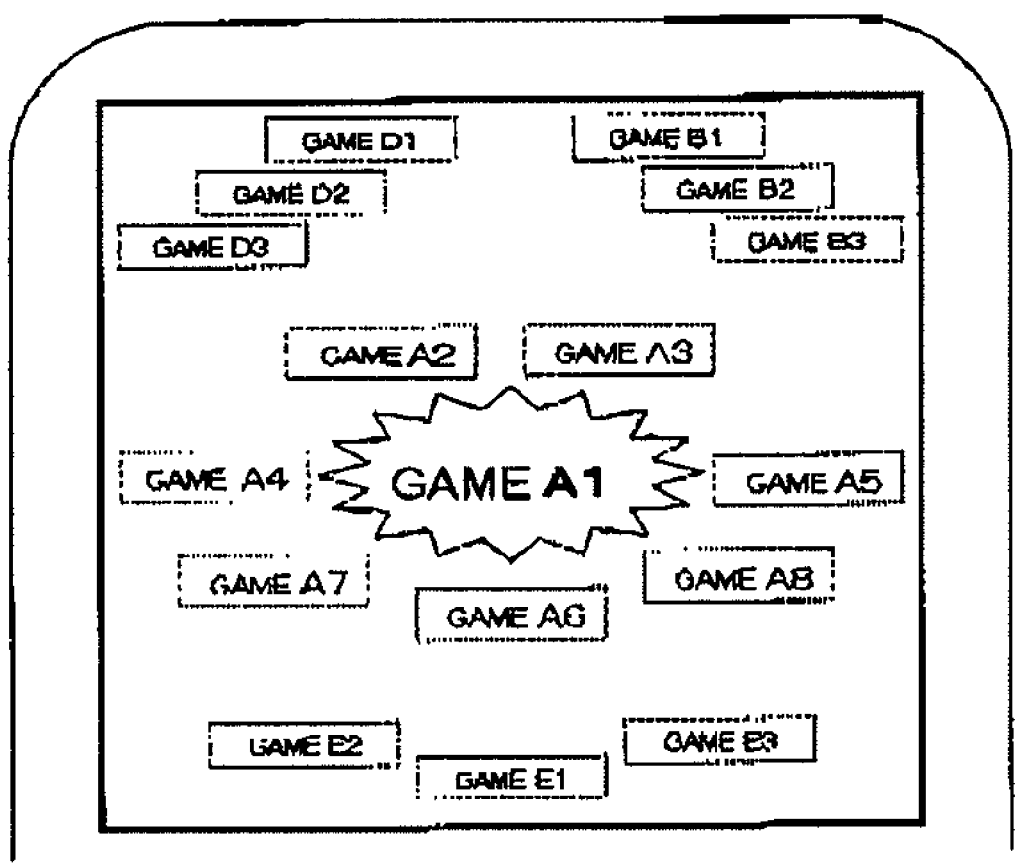
FIG. 15 is a diagram showing an example of a content selection screen to be displayed on a user terminal in the second embodiment in the information retrieval system according to the present invention.

When contents to be displayed as selection candidates are specified, display data for displaying the selection candidates on the display device of the terminal device 20 or 30 is created as shown in FIG. 15. In the example of FIG. 15, the title of the game A1 which is determined as the best match with the retrieval condition designated by the user, the game A1 which is the closest to the position of the position of the user P in the group A which is determined as the best match therewith, as the most popular game A1 in the group A is displayed as a first candidate in the center of the display device which is most noticeable. The titles of the games A2 to A8 belonging to the same group A are displayed at a relatively center portion of the display device around the game A1, which is relatively noticeable.

In the example of FIG. 15, the titles of games D1 to D3, games B1 to B3 and games E1 to E3 which are selected from the group D, the group B and the group E which are determined as being relatively close are displayed at the lower left portion, the upper right portion and the lower center portion of the display device which are less noticeable than the titles of the games selected from the closest group A. While those games do not mostly match with the retrieval condition designated by the user, they are present close to the path from the user's preference to the target object. The titles of games present in the path from the accustomed position of the user (the position of the user P) toward a destination (content or group specified according to the retrieval condition) are displayed. The user seems to be able to select a game as if he or she would enjoy window shopping.

The process in the information retrieval system according to embodiments of the present invention will be described below. In the following description, what is called "content" is game software in the above-described information retrieval system.

Figure 16:
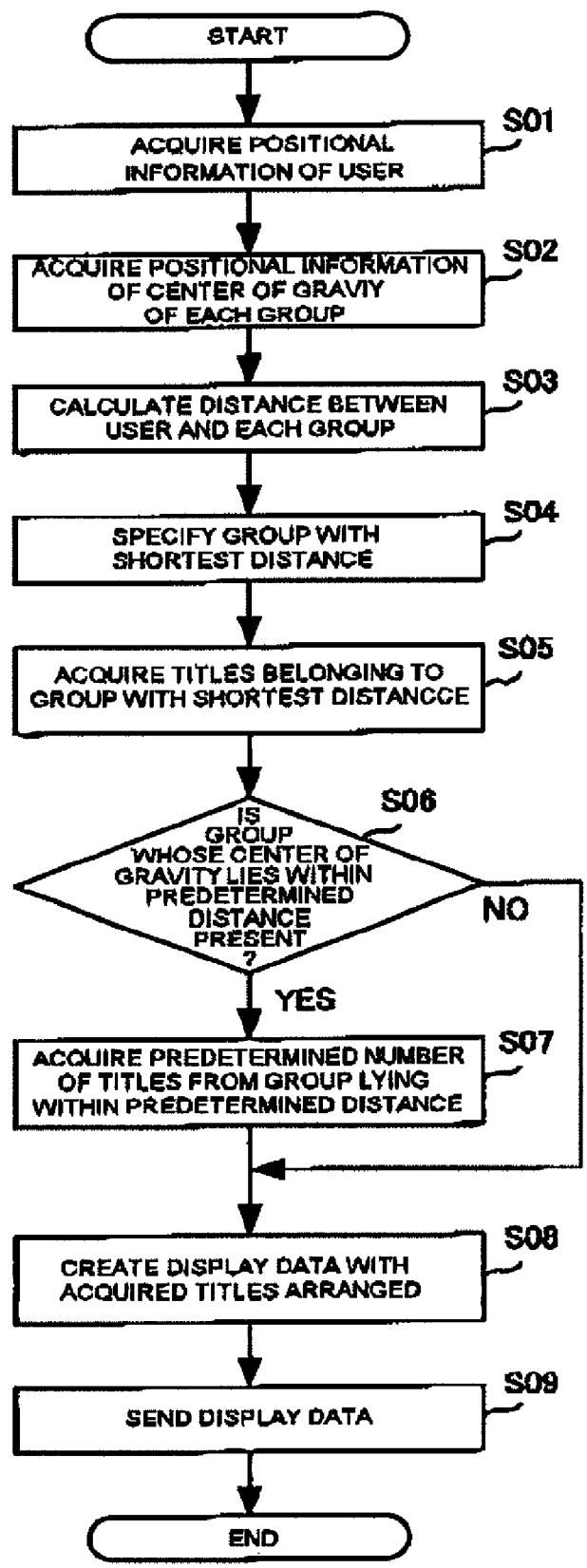
FIG. 16 is a flowchart illustrating the flow of a first embodiment of an information retrieval method according to embodiments of the present invention.

FIG. 16 is a flowchart illustrating the process that the CPU 11 of the content server 10 executes when receiving the display request for the selection screen for contents with no retrieval condition designated. When determining that the NIC 14 has received the display request for the selection screen with the retrieval condition undesignated, the CPU 11 refers to the user information storage section 152 using the user ID or the like included in the display request as a key to acquire the coordinate position of the user's preference or the like (step S01).

The CPU 11 acquires the coordinate position of the center of gravity set for each of groups of contents by referring to the game information storage section 153 (step S02). The CPU 11 calculates the distance between the position of the user acquired in step S01 and the position of the center of gravity of each group acquired in step S02 (step S04). The CPU 11 specifies a group which has the shortest distance to the position of the user (step S05).

The CPU 11 acquires the titles of contents belonging to the group which has the shortest distance to the position of the user specified in step S05, from the game information storage section 153 (step S05). However, the CPU 11 may acquire the titles of only some of the contents belonging to the group which has the shortest distance to the position of the user by the above-described various schemes.

The CPU 11 determines whether there is a group whose distance to the position of the user lies within a predetermined distance, in addition to the group which has the shortest distance to the position of the user (step S06). When there is no group whose distance to the position of the user lies within a predetermined distance, the flow directly proceeds to the process of step S08.

When there is a group whose distance to the position of the user lies within a predetermined distance, the CPU 11 acquires the titles of contents belonging to each group whose distance to the position of the user lies within the predetermined distance from the game information storage section 153 (step S07). In this step, the CPU 11 may likewise acquire the titles of only some of the contents belonging to the group whose distance to the position of the user lies within the predetermined distance by the above-described various schemes. Then, the flow directly proceeds to the process of step S08.

In step S08, the CPU 11 creates display data of the display screen which the titles of the contents acquired in step S05 or S07 are arranged and to be displayed as selection candidate on the terminal device 20 or 30. The layout of the titles in the display data can be as shown in FIG. 8. The CPU 11 sends the created display data from the NIC 14 over the Internet 1 or the like to the terminal device 20 or 30 which has sent the display request (step S09). Then, the process according to the display request for the selection screen is terminated.

FIG. 17 is a flowchart illustrating the process that the CPU 11 of the content server 10 executes when receiving the display request for the selection screen for contents with a retrieval condition designated by the user. When determining that the NIC 14 has received the display request for the selection screen with a retrieval condition designated, the CPU 11 refers to the user information storage section 152 using the user ID or the like included in the display request as a key to acquire the coordinate position of the user's preference or the like (step S11).

The CPU 11 searches the game information storage section 153 with the keyword of the retrieval condition designated by the user to acquire the coordinate position of the content which matches best with the retrieval condition designated by the user from the game information storage section 153 (step S12). The CPU 11 may acquire the coordinate position of the center of gravity of the group which matches best with the retrieval condition designated by the user. The CPU 11 may first specify the group which matches best with the retrieval condition designated by the user, then acquire the coordinate position of a content from the contents included in the group.

The CPU 11 specifies the position of a segment connecting the position of the user acquired in step S11 to the position of the content acquired in step S12 (or the position of the center of gravity of the group of the group) (step S14).

The CPU 11 acquires the position of the center of gravity of one of groups of contents stored in the game information storage section 153 (step S15). The CPU 11 calculates the distance between the position of the segment specified in step S14 and the position of the center of gravity of the group acquired in step S15 (step S16). The CPU 11 determines whether or not the distance to the position of the segment specified in step S14 lies within a predetermined distance previously set (step S17). If the distance to the position of the user does not lie within the predetermined distance, the flow directly proceeds to the process of step S19.

If the distance to the position of the segment lies within the predetermined distance, the CPU 11 acquires the titles of contents belonging to each group whose distance to the segment lies within the predetermined distance from the game information storage section 153 (step S18). In this step, the CPU 11 may acquire the titles of only some of the contents belonging to the group by the above-described various schemes. Then, the flow proceeds to the process of step S19.

In step S19, it is determined whether or not a group for which the processes of steps S15 to S18 have not been executed is present in the groups of the contents. If there is a group for which the processes have not been executed, the flow returns to step S15 where the CPU 11 acquires the position of the center of gravity of a next group.

If there is no group for which the processes of steps S15 to S18 have not been executed, the CPU 11 acquires the titles of contents belonging to a group lying at the end point of the segment (i.e., group including the position acquired in step S12) from the game information storage section 153 (step S20). When the position of the center of gravity of the group at the end point lies within the predetermined distance, the contents belonging to the group have already been acquired in step S18, so that the CPU 11 need not newly acquire contents here. In this step, the CPU 11 may acquire the titles of only some of the contents belonging to the group at the end point of the segment.

The CPU 11 creates display data of the display screen which the titles of the contents acquired in step S18 or S20 are arranged and to be displayed as selection candidates on the terminal device 20 or 30 (step S21). The layout of the titles in the display data can be as shown in FIG. 15. The CPU 11 sends the created display data from the NIC 14 over the Internet 1 or the like to the terminal device 20 or 30 which has sent the display request (step S22). Then, the process according to the display request for the selection screen is terminated.

INDUSTRIAL APPLICABILITY

The present invention can be used for any kind of contents to be target contents in a case of recommending useful contents to a user as long as information relating to the contents, which are displayed on the selection screen of a user terminal like a cellular phone to be selection candidates for the user, is retrieved. However, the invention is used most suitably for highly entertaining contents such as game softwares.

The invention claimed is:

1. An information retrieval method for allowing a computer system that has received a request from a user terminal to retrieve information relating to contents to be displayed on the user terminal as selection candidates for a user, the method comprising:

acquiring user positional information corresponding to user identification information received from the user terminal by referring to a user information storage that stores information which can specify a composition of a user as the user positional information using at least two coordinate axes;

receiving retrieval information input to the user terminal, and searching a content information storage that stores the information relating to the contents to specify one of the contents which matches with a retrieval condition as an index content using the retrieval information;

acquiring index positional information of the index content from a content positional information storage that stores content classification information as content positional information using the at least two coordinate axes used for the user positional information;

acquiring group positional information which is a representative position of each of at least two groups into which the contents are classified from the content positional information storage;

executing an approximation calculation on line positional information of a line segment connecting the user positional information to the index positional information of the index content, and the group positional information;

specifying at least one content included in one of the at least two groups which is determined as having one of a higher order of approximation than a predetermined order of approximation in the approximation calculation and an order of approximation within a predetermined rank;

creating display data to be displayed as the selection candidates on the user terminal based on information relating to the index content and information relating to the at least one content specified when specifying the at least one content; and transmitting the display data to the user terminal, wherein the display data is data to display information relating to contents included in a first group including the index content at a center portion of a display device of the user terminal, and to display information relating to contents included in a second group which does not include the index content at a peripheral portion of the display device.

2. The information retrieval method according to claim 1, wherein the display data is data to display the information relating to the index content at a center of the display device of the user terminal, and to display information relating to contents other than the index content around the information relating to the index content.

3. An information retrieval method for allowing a computer system, which has received a request from a user terminal, to retrieve information relating to contents to be displayed on the user terminal as selection candidates for a user, the method comprising:

acquiring user positional information corresponding to user identification information received from the user terminal by referring to a user information storage which stores information that can specify a composition of a user as the user positional information using at least two coordinate axes;

receiving retrieval information input to the user terminal, and searching a content information storage, which stores the information relating to the contents, to specify an index group that matches with a retrieval condition from among at least two groups into which the contents are classified using the retrieval information;

acquiring index positional information of the index group, which is a representative position of the index group, from a content positional information storage that stores content classification information as content positional information using the at least two coordinate axes used for the user positional information;

acquiring group positional information, which is a representative position of each of the at least two groups into which the contents are classified, from the content positional information storage;

executing an approximation calculation on line positional information of a line segment connecting the user positional information to the index positional information of the index group, and the group positional information;

specifying at least one content included in one of the at least two groups which is determined as having one of a higher order of approximation than a predetermined order of approximation in the approximation calculation and an order of approximation within a predetermined rank;

creating display data to be displayed as the selection candidates on the user terminal based on information relating to at least one content included in the index group and information relating to the at least one content specified when specifying the at least one content; and transmitting the display data to the user terminal, wherein the display data is data to display information relating to contents included in the index group at a center portion of a display device of the user terminal, and to display information relating to contents included in an other group different than the index group at a peripheral portion of the display device.

4. The information retrieval method according to claim 3, wherein the creating display data includes executing an approximation calculation on positional information of a content included in the index group and the user positional information to thereby select information relating to a content which is determined as having one of a higher order of approximation than the predetermined order of approximation and an order of approximation within the predetermined rank, and uses the selected information in creating the display data.

5. The information retrieval method according to claim 3, wherein the creating display data includes selecting information relating to a content which has one of a higher frequency of access than a predetermined frequency and a frequency of access within the predetermined rank, among contents included in the index group by referring to an access information storage that stores information relating to frequencies of access to contents, and uses the selected information in creating the display data.

6. An information retrieval method for allowing a computer system that has received a request from a user terminal to retrieve information relating to contents to be displayed on the user terminal as selection candidates for a user, the method comprising:

acquiring user positional information corresponding to user identification information received from the user terminal by referring to a user information storage, which stores information that can specify a composition of a user as the user positional information using at least two coordinate axes;

receiving retrieval information input to the user terminal, and searching a content information storage, which stores the information relating to the contents, to specify an index group that matches with a retrieval condition from among at least two groups into which the contents are classified using the retrieval information;

specifying one content of contents which are included in the index group as an index content;

acquiring index positional information of the index content from a content positional information storage, which stores content classification information as content positional information using the at least two coordinate axes used for the user positional information;

acquiring group positional information, which is a representative position of each of the at least two groups into which the contents are classified from the content positional information storage;

executing an approximation calculation on line positional information of a line segment connecting the user positional information to the index positional information of the index content, and the group positional information;

specifying at least one content included in one of the at least two groups which is determined as having one of a higher order of approximation than a predetermined order of approximation in the approximation calculation and an order of approximation within a predetermined rank;

creating display data to be displayed as the selection candidates on the user terminal based on information relating to the index content and information relating to the at least one content specified when specifying the at least one content; and transmitting the display data to the user terminal, wherein the display data is data to display information relating to contents included in the index group at a center portion of a display device of the user terminal, and to display information relating to contents included in an other group different than the index group at a peripheral portion of the display device.

7. The information retrieval method according to claim 6, wherein the specifying the at least one content includes executing an approximation calculation on positional information of each content included in the index group and the user positional information to thereby specify a content which is determined as having a highest order of approximation as the index content.

8. The information retrieval method according to claim 6, wherein the specifying the at least one content includes specifying a content which has a highest frequency of access among contents included in the index group as the index content by referring to an access information storage that stores information relating to frequencies of access to contents.

9. The information retrieval method according to claim 6, wherein the display data is data to display the information relating to the index content at a center of the display device of the user terminal, and to display information relating to contents other than the index content around the information relating to the index content.

10. A computer-readable storage medium including an information retrieval program for allowing a computer system that has received a request from a user terminal to retrieve information relating to contents to be displayed on the user terminal as selection candidates for a user, the information retrieval program causing the computer system to execute:
acquiring user positional information corresponding to user identification information received from the user terminal by referring to a user information storage which stores information that can specify a composition of a user as the user positional information using at least two coordinate axes;
receiving retrieval information input to the user terminal, and searching a content information storage, which stores the information relating to the contents, to specify one of the contents that matches with a retrieval condition as an index content using the retrieval information;
acquiring index positional information of the index content from a content positional information storage which stores content classification information as content positional information using the at least two coordinate axes used for the user positional information;
acquiring group positional information, which is a representative position of each of at least two groups into which the contents are classified, from the content positional information storage;
executing an approximation calculation on line positional information of a line segment connecting the user positional information to the index positional information of the index content, and the group positional information;
specifying at least one content included in one of the at least two groups which is determined as having one of a higher order of approximation than a predetermined order of approximation in the approximation calculation and an order of approximation within a predetermined rank;
creating display data to be displayed as the selection candidates on the user terminal based on information relating to the index content and information relating to the at least one content specified when specifying the at least one content; and
transmitting the display data to the user terminal, wherein the display data is data to display information relating to contents included in a first group including the index content at a center portion of a display device of the user terminal, and to display information relating to contents included in a second group which does not include the index content at a peripheral portion of the display device.

11. A computer apparatus, connected to the user terminal over a network, comprising: a data storage that stores data; a program storage that stores a program; a processor that executes the program stored in the program storage; and a transmitter that transmits data to the user terminal under control of the processor, wherein
the data storage includes at least the user information storage that stores the information which can specify the composition of the user as the user positional information using the at least two coordinate axes, the content information storage that stores the information relating to the contents, and the content positional information storage that stores the content classification information as the content positional information using the at least two coordinate axes used for the user positional information,
the program storage comprises the computer-readable storage medium including the information retrieval program as set forth in claim 10, and
the program to be executed by the processor comprises the information retrieval program.

12. A computer-readable storage medium including an information retrieval program for allowing a computer system that has received a request from a user terminal to retrieve information relating to contents to be displayed on the user terminal as selection candidates for a user, the program including:
a user acquiring code segment that acquires user positional information corresponding to user identification information received from the user terminal by referring to a user information storage which stores information that can specify a composition of a user as the user positional information using at least two coordinate axes;
a receiving code segment that receives retrieval information input to the user terminal, and searches a content information storage which stores the information relating to the contents to specify an index group that matches with a retrieval condition from among at least two groups into which the contents are classified using the retrieval information;
a positional acquiring code segment that acquires index positional information of the index group, which is a representative position of the index group, from a content positional information storage which stores content classification information as content positional information using the at least two coordinate axes used for the user positional information;
a group acquiring code segment that acquires group positional information which is a representative position of each of the at least two groups into which the contents are classified from the content positional information storage;
an executing code segment that executes an approximation calculation on line positional information of a line segment connecting the user positional information to the index positional information of the index group, and the group positional information;
a specifying code segment that specifies at least one content included in one of the at least two groups which is determined as having one of a higher order of approximation than a predetermined order of approximation in the approximation calculation and an order of approximation within a predetermined rank;

a creating code segment that creates display data to be displayed as the selection candidates on the user terminal based on information relating to at least one content included in the index group and information relating to the at least one content specified in the content specifying segment; and a transmitting code segment that transmits the display data to the user terminal, wherein the display data is data to display information relating to contents included in the index group at a center portion of a display device of the user terminal, and to display information relating to contents included in an other group different than the index group at a peripheral portion of the display device.

13. A computer apparatus, connected to the user terminal over a network, comprising: a data storage that stores data; a program storage that stores a program; a processor that executes the program stored in the program storage; and a transmitter that transmits data to the user terminal under control of the processor, wherein the data storage includes at least the user information storage that stores the information which can specify the composition of the user as the user positional information using the at least two coordinate axes, the content information storage that stores the information relating to the contents, and the content positional information storage that stores the content classification information as the content positional information using the at least two coordinate axes used for the user positional information, the program storage comprises the computer-readable storage medium including the information retrieval program as set forth in claim 12, and the program to be executed by the processor comprises the information retrieval program as set forth in claim 12.

14. A computer-readable storage medium including an information retrieval program for allowing a computer system that has received a request from a user terminal to retrieve information relating to contents to be displayed on the user terminal as selection candidates for a user, the program including:

a user acquiring code segment that acquires user positional information corresponding to user identification information received from the user terminal by referring to a user information storage, which stores information that can specify a composition of a user as the user positional information using at least two coordinate axes;

a receiving code segment that receives retrieval information input to the user terminal, and searches a content information storage, which stores the information relating to the contents, to specify an index group that matches with a retrieval condition from among at least two groups into which the contents are classified using the retrieval information;

an index specifying code segment that specifies one content of contents which are included in the index group as an index content;

a positional acquiring code segment that acquires index positional information of the index content from a content positional information storage, which stores content classification information as content positional information using the at least two coordinate axes used for the user positional information;

a group acquiring code segment that acquires group positional information, which is a representative position of each of the at least two groups into which the contents are classified, from the content positional information storage;

an executing code segment that executes an approximation calculation on line positional information of a line segment connecting the user positional information to the index positional information of the index content, and the group positional information;

a content specifying code segment that specifies at least one content included in one of the at least two groups which is determined as having one of a higher order of approximation than a predetermined order of approximation in the approximation calculation and an order of approximation within a predetermined rank;

a creating code segment that creates display data to be displayed as the selection candidates on the user terminal based on information relating to the index content and information relating to the at least one content specified in the content specifying code segment; and a transmitting code segment that transmits the display data to the user terminal, wherein the display data is data to display information relating to contents included in the index group at a center portion of a display device of the user terminal, and to display information relating to contents included in an other group different than the index group at a peripheral portion of the display device.

15. A computer apparatus, connected to the user terminal over a network, comprising: a data storage that stores data; a program storage that stores a program; a processor that executes the program stored in the program storage; and a transmitter that transmits data to the user terminal under control of the processor, wherein the data storage includes at least the user information storage that stores the information which can specify the composition of the user as the user positional information using the at least two coordinate axes, the content information storage that stores the information relating to the contents, and the content positional information storage that stores the content classification information as the content positional information using the at least two coordinate axes used for the user positional information, the program storage comprises the computer-readable storage medium including the information retrieval program as set forth in claim 14, and the program to be executed by the processor comprises the information retrieval program as set forth in claim 14.

16. A computer system that, in response to a request from a user terminal connected thereto over a network, transmits display data including information relating to contents to be displayed on the user terminal as selection candidates for a user, the computer system comprising:

a user information storage that stores information which can specify a composition of a user as user positional information using at least two coordinate axes;

a user positional information acquirer that acquires the user positional information corresponding to user identification information received from the user terminal by referring to the user information storage;

an index content receiver that receives retrieval information input to the user terminal, and searches a content information storage, which stores the information relating to the contents to specify one of the contents that matches with a retrieval condition as an index content using the retrieval information;

a content positional information storage that stores content classification information as content positional information using the at least two coordinate axes used for the user positional information;

an index content positional information acquirer that acquires index positional information of the index content from the content positional information storage;

a group positional information acquirer that acquires group positional information, which is a representative position of each of at least two groups into which the contents are classified, from the content positional information storage;

an approximation calculation executor that executes an approximation calculation on line positional information of a line segment connecting the user positional information to the index positional information of the index content, and the group positional information acquired by the group positional information acquirer;

a content specifier that specifies at least one content included in one of the at least two groups which is determined as having one of a higher order of approximation than a predetermined order of approximation in the approximation calculation and an order of approximation within a predetermined rank;

a display data creator that creates display data to be displayed as the selection candidates on the user terminal based on positional information relating to the index content and information relating to the at least one content specified by the content specifier; and a display data transmitter that transmits the display data to the user terminal, wherein the display data is data to display information relating to contents included in a first group including the index content at a center portion of a display device of the user terminal, and to display information relating to contents included in a second group which does not include the index content at a peripheral portion of the display device.

17. A computer system that, in response to a request from a user terminal connected thereto over a network, transmits display data including information relating to contents to be displayed on the user terminal to be selection candidates for a user, the computer system comprising:

a user information storage that stores information which can specify a composition of a user as user positional information using at least two coordinate axes;

a user positional information acquirer that acquires the user positional information corresponding to user identification information received from the user terminal by referring to the user information storage;

an index group receiver that receives retrieval information input to the user terminal, and searches a content information storage, which stores the information relating to the contents to specify an index group that matches with a retrieval condition from among at least two groups into which the contents are classified using the retrieval information;

a content positional information storage that stores content classification information as content positional information using the at least two coordinate axes used for the user positional information;

an index group positional information acquirer that acquires index positional information of the index group, which is a representative position of the index group, from the content positional information storage;

a group positional information acquirer that acquires group positional information, which is a representative position of each of the at least two groups into which the contents are classified, from the content positional information storage;

an approximation calculation executor that executes an approximation calculation on line positional information of a line segment connecting the user positional information to the index positional information of the index group, and the group positional information acquired by the group positional information acquirer;

a content specifier that specifies at least one content included in one of the at least two groups which is determined as having one of a higher order of approximation than a predetermined order of approximation in the approximation calculation and an order of approximation within a predetermined rank;

a display data creator that creates display data to be displayed as the selection candidates on the user terminal based on information relating to at least one content included in the index group and information relating to the at least one content specified by the content specifier; and a display data transmitter that transmits the display data to the user terminal, wherein the display data is data to display information relating to contents included in the index group at a center portion of a display device of the user terminal, and to display information relating to contents included in an other group different than the index group at a peripheral portion of the display device.

18. A computer system that, in response to a request from a user terminal connected thereto over a network, transmits display data including information relating to contents to be displayed on the user terminal to be selection candidates for a user, the computer system comprising:

a user information storage that stores information which can specify a composition of a user as user positional information using at least two coordinate axes;

a user positional information acquirer that acquires the user positional information corresponding to user identification information received from the user terminal by referring to the user information storage;

an index group receiver that receives retrieval information input to the user terminal, and searches a content information storage, which stores the information relating to the contents to specify an index group that matches with a retrieval condition from among at least two groups into which the contents are classified using the retrieval information;

an index content specifier that specifies one content of contents which are included in the index group as an index content;

a content positional information storage that stores content classification information as content positional information using the at least two coordinate axes used for the user positional information;

an index content positional information acquirer that acquires index positional information of the index content from the content positional information storage;

a group positional information acquirer that acquires group positional information, which is a representative position of each of the at least two groups into which the contents are classified, from the content positional information storage;

an approximation calculation executor that executes an approximation calculation on line positional information of a line segment connecting the user positional information to the index positional information of the index content, and the group positional information acquired by the group positional information acquirer;

a content specifier that specifies at least one content included in one of the at least two groups which is determined as having one of a higher order of approximation than a predetermined order of approximation in the approximation calculation and an order of approximation within a predetermined rank;

a display data creator that creates display data to be displayed as the selection candidates on the user terminal based on positional information relating to the index content and information relating to the at least one content specified by the content specifier; and a display data transmitter that transmits the display data to the user terminal, wherein the display data is data to display information relating to contents included in the index group at a center portion of a display device of the user terminal, and to display information relating to contents included in an other group different than the index group at a peripheral portion of the display device.

* * * * *